US006516464B1

(12) United States Patent
Claessens

(10) Patent No.: US 6,516,464 B1
(45) Date of Patent: Feb. 4, 2003

(54) METHOD AND SYSTEM FOR DETECTING AUDIENCE RESPONSE AUDIO VISUAL STIMULI

(75) Inventor: Dominique Paul Gerard Claessens, Geneva (CH)

(73) Assignee: Verify International N.V., Curacao (NL)

( * ) Notice: Subject to any disclaimer, the term of this patent is extended or adjusted under 35 U.S.C. 154(b) by 0 days.

(21) Appl. No.: 09/423,755

(22) PCT Filed: May 12, 1998

(86) PCT No.: PCT/NL98/00267

§ 371 (c)(1), (2), (4) Date: Dec. 30, 1999

(87) PCT Pub. No.: WO98/52310

PCT Pub. Date: Nov. 19, 1998

(30) Foreign Application Priority Data

May 13, 1997 (NL) ............................................ 1006042

(51) Int. Cl.[7] .......................... H04N 7/16; H04N 7/173

(52) U.S. Cl. .............................. 725/9; 725/10; 725/24; 725/35; 725/36

(58) Field of Search ................................ 725/9, 24, 35, 725/36, 42, 46

(56) References Cited

U.S. PATENT DOCUMENTS 4,646,145 A 2/1987 Percy et al.
5,227,874 A * 7/1993 Von Kohorn
5,251,324 A * 10/1993 McMullan, Jr. .............. 725/14
5,446,919 A * 8/1995 Wilkins ........................ 725/35
5,453,015 A * 9/1995 Vogel .......................... 434/350
5,721,583 A * 2/1998 Harada et al. ................ 725/24
5,872,588 A * 2/1999 Aras et al. ..................... 725/14
5,880,720 A * 3/1999 Iwafune et al. ............... 725/24
6,002,393 A * 12/1999 Hite et al. .................. 345/719

FOREIGN PATENT DOCUMENTS

DE 4401571 A1 7/1994
EP 0118043 A2 9/1984
EP 0118043 B1 8/1988
GB 2286280 A 8/1995

* cited by examiner

*Primary Examiner*—Bhavesh Mehta
*Assistant Examiner*—Kieu-Oanh Bui
(74) *Attorney, Agent, or Firm*—Young & Thompson

(57) ABSTRACT

A system for testing audiovisual stimuli, such as television series, commercials, etc. from a complex of interactions between stimuli, consumers and environmental factors includes: one or more sources of audiovisual stimuli; a part connected to the sources for presenting the stimuli to respondents; a switching part to be operated by the respondents for issuing commands such as a command to end the presentation of a stimulus; a part for registering the moments at which the switching parts are operated; a generator for generating further stimuli, such as textual information including questions, messages, commands and instructions; a part to be operated by the respondents for providing responses to the further stimuli such as providing answers to questions and providing reasons, such as reasons for ending the presentation of stimuli; and a part for registering the responses provided by the respondents.

14 Claims, 2 Drawing Sheets presentation period commercial : 30 sec.

METHOD AND SYSTEM FOR DETECTING AUDIENCE RESPONSE AUDIO VISUAL STIMULI

BACKGROUND OF THE INVENTION

The invention relates to a method and system for testing audiovisual stimuli, such as television series, commercials, etc. from a complex of interactions between stimuli, consumers and environmental factors, which system comprises:

one or more sources of audiovisual stimuli;

means connected to aid sources for presenting the stimuli to respondents;

switching means to be operated by said respondents for issuing commands such as a command to end the presentation of a stimulus;

registering means for registering the moments at which the switching means are operated.

DESCRIPTION OF THE RELATED ART

Such a system is known from the American patent U.S. Pat. No. 4,67,964. This prior art system is related to testing commercials according to a method whereby the commercial to be tested forms part of a program that can be selected by a test person from an offered amount of different programs. Tests can be carried out for instance on sequence effects with other commercials. A commercial to be tested is preceded or followed by one or more "filler" commercials. The contemporaneously selected program is as measurement data registered through a video recorder. Furthermore the moments in time on which selection or zapping operations are carried out are measured. The method strives to imitate a realistic situation whereby one program from an offered number of different stimuli can be selected comparable with the selection of a channel on a TV-apparatus.

Different from this patent there is a larger need in interested circles, such as producers, program makers, campaign leaders, opinion pollers and also advertisers for accurate information about the viewing behaviour of consumers. For advertisers it is for instance important to know if all consumers continue to following the broadcast during a commercial break. Or does one walk away? Does one switch over to another program? What are the moments on which the attention of the public for instance for a commercial is lost completely or at least partly and one decides to switch away or direct the attention to something else? What are the reasons for switching away? Is the advertisement too well known or does one switch away for other reasons? Is the behaviour of men different from the behaviour of women, of younger people different from the behaviour of older people, etc.? Which sub-groups of for instance the Dutch population do exhibit a specific behaviour, when, under which circumstances and in what degree? The problem of the advertiser is not so much only the range of the TV-transmitters but more the reception by the public.

A number of environmental factors, whether or not simultaneously, can be of influence on maintaining the attention of respondents. Besides that there are a number of factors which are related to the commercials as such: is the presented product in a commercials relevant? Is the commercial irritating, worn out or does it comprise unattractive scenes?

Under normal conditions all consumers are able to follow (view, observe) all advertisements completely at least once in a period. Part of the audience will disappear as soon as the offered product appears to be not relevant for them. That is an unavoidable phenomena. However, a switching operation caused by other reasons such as unattractive scenes in an advertisement for a product which is relevant for the respondent, could be prevented if one knows the reason for the switching operation and, in this example, is able to identify the unattractive scenes.

It is more the object of the advertisers to draw the attention to a mark, a product and a message and to communicate thereabout through a commercial. Premature switching away could imply that the mark, the product and/or the message are not brought under the attention and that therewith obtaining the communication goal is excluded.

It follows from the above that the need of amongst others the above-mentioned interested circles relates more specifically to the ability to determine and specify the communicative performance of audio visual stimuli, such as motion pictures, musical movies, opera, theatre, music, orchestras and furthermore audio visual stimuli such as video programs, t.v.-series, commercials, news programs and promotions and furthermore of speeches, lectures, announcements and debates for instance for determining and following the opinions in relation to politicians or theatre for instance for selecting actors for roles etc., etc.

The communicative performance of audio visual stimuli can be determined only by measuring, registrating and analysing a complex of interactions between amongst other stimuli, consumers and environmental factors. The viewing behaviour of consumers can thereby be considered as one of the interaction aspects.

Registrating programs selected by a respondent, together with the switching times in agreement with the known prior art method results into data which are non-sufficient as such and which are non-sufficiently refined to be able to determine therefrom in a reliable and accurate manner the performance capabilities of audio visual stimuli. More specifically the method is not adequate because:

it is mainly based on the registered data of just some test persons and some stimuli;

apart from measurements related to the influences of the sequence of the commercials there is no registration of conditions and the environmental factors which all together have a separate influence on maintaining the attention of respondents on a stimulus and as a result thereof on the respondent's behaviour;

mainly rough data are produced which only after analysis and processing may lead to results which are relevant and interpretable for performance capabilities and which are related to other stimuli.

SUMMARY OF THE INVENTION

The object of the invention is now to provide another method and system for determining and specifying reliably and accurately the communicative performance of audio visual stimuli. This object is fulfilled by a system which is specified in the attached claims.

DESCRIPTION OF THE PREFERRED EMBODIMENTS

Figure 1:
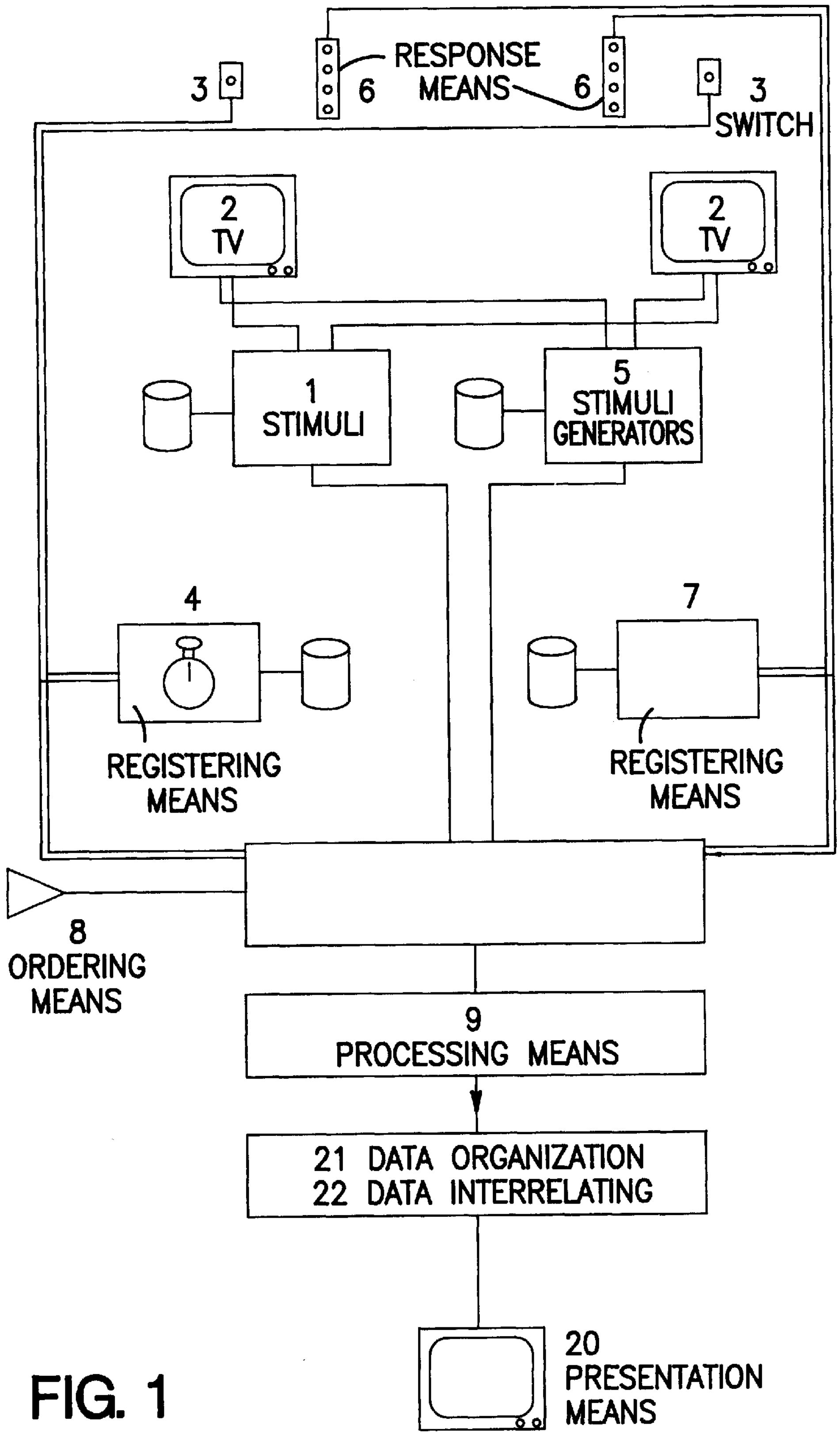
FIG. 1 schematically represents a preferred embodiment.

The method according to the invention, using the system as described in the claims, is characterized in that insight providing results in relation to the performance capabilities of audio visual stimuli art obtained by:

- providing an answer to the question if one wants to continue viewing audio visual stimuli or not, and in case not:
- determining precisely at which moments, for instance during a commercial break, loss of audience is observed;
- indicate precisely at which places or at which scenes, for instance in a commercial, premature switching away is observed;
- being able to indicate the reasons for the premature switching operation;
- being able in relation to said reasons to distinguish between switching away because the commercial was already known, the commercial is for instance too well known, or switching away from a commercial which is not known yet for other reasons;
- determining accurately the influence of environmental factors on maintaining the attention of respondents on a stimulus;
- processing automatically large numbers of data derived from large numbers of respondents into accumulated simple and for anyone interpretable results per stimulus and/or per group of stimuli, such as processing the data of many hundreds or more stimuli and many hundreds of respondents;
- being able to present per stimulus of per group of stimuli the results of for instance one complete random survey, for instance a random survey which is representative for the whole population, as well as for a selection of sub-groups, for instance all the men, all the women etc.;
- being able to mutually relate and therewith being able to judge the results of stimuli and groups of stimuli, for instance of stimuli related to the same mark, related to the same product or product category, stimuli transmitted within the same commercial break, on the same television channel, etc.;
- being able to mutually relate and therewith to judge the results of respondent groups and therein selected sub-groups.

On the basis of data, produced by means of the invention, an advertiser is able to obtain insight providing information about its spot. If demonstrably a spot scores insufficiently, then one will correct the commercial before starting or proceeding broadcasting thereof with the aim to improve the spot and maintain eventually a larger part of the audience.

The method according to the invention is further characterized in that the individual program arrangement can be personalised per respondent, for instance based on demographic data such as personal variables amongst which sex, age and social position; but also based on area of interest, preferences and habits. Data which can be predetermined and can be registered through a chip card based on which after reading the data into and initializing the system for carrying out the method, the parts of the program can be assembled automatically.

Furthermore the method according to the invention is characterized in that the respondents themselves are able to determine to which stimuli attention is paid and for how long. At the moment a respondent does not want to view a program section any longer he is able to finish said program section with the switching means.

In case a program to be viewed comprises commercials each respondent can be presented a series of different spots which for each respondent then not in the same sequential order. At the moment a respondent decides that he has seen enough of a spot he is able to switch away and end therewith the presentation of said spot. By ending a presentation a number of different activities can be initiated in the respective presentation unit, for instance:

- Presentation of a new stimulus such as a further commercial. This further commercial can be selected from a file having a large number of stimuli, for instance rubricated and stored in a data base. The selection can be based for instance on the personal data of the respondents.
- Presentation of a program part which has an association with the just finished stimulus and comprises for instance a number of texts from which, using response means, such as a touch screen, one or more can be selected. The texts could be related to a number of different subjects such as;
  - the possible reasons why a stimulus was switched off prematurely and one did not view the presentation any further;
  - questions about for instance the last presented stimulus, whether or not viewed as a whole. In case of TV-spots one could ask for instance the mark, the name of the advertiser, the presented product and the message related to the product or the service;
  - instructions, related for instance to the tasks to be carried out by respondents;
  - comments.

For each of the possibilities for instance a number of different groups of texts car be selected whereby the selection may be performed on the basis of for instance:

- the length of a stimulus, for instance a spot;
- the subject of said spot;
- the promoted mark, product or message;
- the exact moment of switching away;
- all conceivable further characteristics, qualities and data of:
  - audio visual stimuli;
  - respondents;
  - reactions of respondents on audio visual stimuli.

It is furthermore determined whether or not a switched-off stimulus is known by the respondents. In that way it is possible to distinguish between for instance switching away from a too well known commercial and a commercial which is not known yet, whereby the switching away may take place for other reasons. For determining whether or not the characteristics of audio visual stimuli are known with a person use is made of a method as described in the Dutch patent application 1004598.

Characteristic for the invention is furthermore the apparent real time intactivity. Being able to react on stimuli presentations, being able to finish at any moment the presentation of running programs and starting other programs. As soon as a program part is switched away another part is selected which almost directly is ready for presentation. In this way the running program is as it seems replaced in real time by the next program.

In case of zapping on a t.v.-set one generally is only able to go to a specific scene in another program on another channel at the time of switching. The preceding activities on that channel are lost. The system for carrying out the method according to the invention provides the possibility to start the next program at any desired scene, for instance at the beginning, so that each respondent is presented with program sections at an identical way. Or for instance at an arbitrary scene, such that each respondent is presented with program sections in a different way.

By means of one or more time axes for each respondent it is measured and registered with high accuracy, in parts of seconds, for instance with video frame resolution, how long stimuli and program sections are presented and at which moments program sections are prematurely switched away. Furthermore it is registered which reasons are indicated for switching away stimuli and what reactions where given to presented questions, tasks or instructions.

By accurately, for instance with video frame resolution, relating the time axes and therewith the individually obtained measurement values for all respondents and for all stimuli, for instance by synchronizing and thereafter cumulating, an overview of the common behaviour of for instance a complete random sample or part thereof is created. The common behaviour patterns provide for instance insight in the behaviour correspondences as well as in the behaviour differences for groups of respondents. A presentation is for instance created of the moments onto which stimuli were switched off or for instance the reasons indicated by groups of respondents for switching off in-dividual stimuli. However, also the time which passes before one indicates a reason, before one answers questions and the time which is necessary for carrying out instructions.

The method according to the invention is furthermore characterized in that massive numbers of measurement data and massive numbers of respondents, amongst which the reactions on presented stimuli, are processed automatically into results. The results can be interrelated mutually in many ways and judged therefore in many ways. The results can be specified through software programs into insight providing information and can be presented thereafter as measuring protocols.

The measuring protocols could obtain information about the communicative performance of one of the stimuli presented to the respondents but also of a selective number of stimuli. The measuring protocols can be related to the data of a whole random sample but can also be related to sub-groups thereof. The reactions for instance on program sections by men, women, men older than 30 etc., etc.. The measuring protocols could be related to each conceivable combination of data.

The system related to the method according to the invention is in one of its possible embodiments and only for illustrative purposes schematically represented in FIG. 1 and is characterized by one or more of the following components:

- sources of audio visual stimuli (1);
- means, e.g. television screens, connected to said sources for presenting the stimuli to respondents (2);
- switching means to be operated by respondents for indicating instructions, such as instructions for finishing the presentation of stimuli (3);
- registering means for registering, the time moments onto which the switching means are operated (4);
- stimuli generating means for generating further stimuli, such as texts, amongst which questions, messages, comments and instructions (5);
- response means to be operated by respondents for indicating responses to the further stimuli such as providing answers to questions and providing reasons, such as reasons for finishing the presentation of stimuli (6);
- registering means for registering the responses provided by the respondents (7);
- ordering means for, dependent on the conditions, changing of the presentation characteristics or the sequential order of the stimuli (8);
- the registering means including a timing means for determining and registering if and when and how long individual stimuli were presented to respondents (4);
- processing means for automatically processing massive numbers of data of massive numbers of respondents into results (9);
- presentation means for presenting the results per stimulus or per group of stimuli (20);
- data organization means for presenting the results per sample or parts thereof (21); data interrelating means for interrelating the results of one or more stimuli, groups of stimuli, samples and partial groups of respondents (22).

Figure 2:
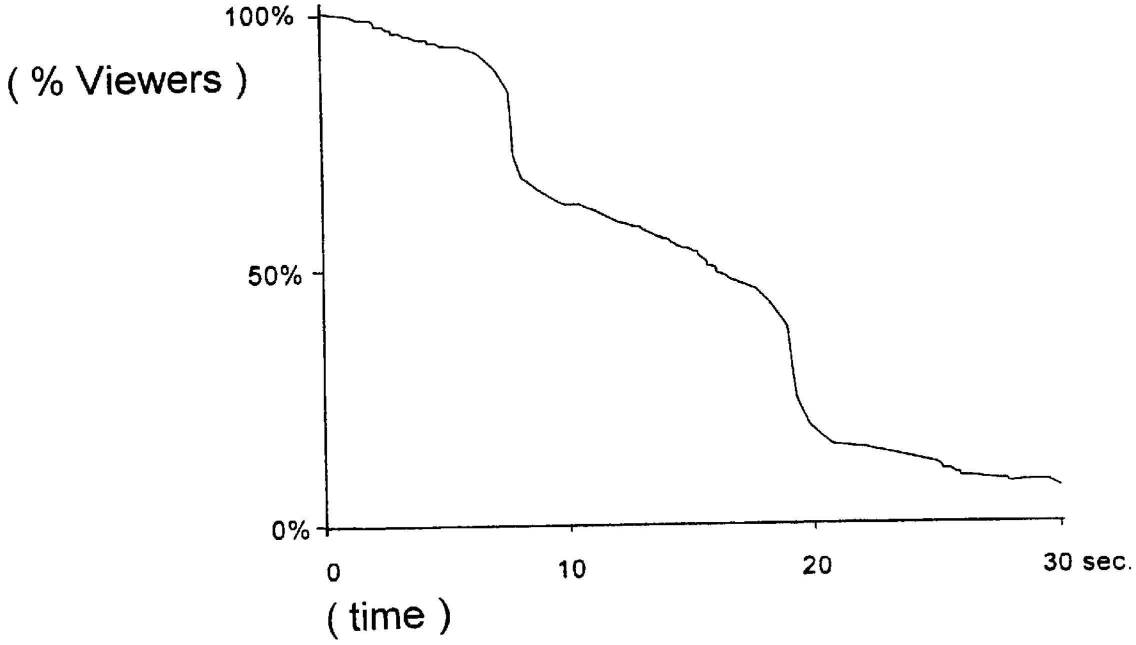
FIG. 2 is a viewer interest curve.

Just for illustrative purposes in FIG. 2 the typical curve of viewers who have lost their interest is presented, in this time during a commercial of 30 seconds.

The curve indicates that the interest of approximately 35% of the viewers was already lost after 10 seconds. After 20 seconds only about 20% of the original number of viewers is left. Only a view percent of the original number of viewers does not switch away the commercial prematurely.

What is claimed is:

1. System for testing audiovisual stimuli and sequences of audiovisual stimuli, which system comprises:

- at least one source (1) of audiovisual stimuli;
- means (2) connected to said at least one source of audiovisual stimuli for presenting said stimuli to at least two respondents;
- means for time marking starts and stops of the presentations of stimuli;
- switching means (3) to be operated by said respondents to stop the presentation of contemporaneously presented stimulus or stimuli sequence;
- registering means (4) for registering moments at which the switching means are operated;
- a generator (5) for generating questions, messages, commands and instructions;
- response means (6) to be operated by the respondent to provide responses to said questions, messages, commands and instructions; and
- registering means (7) for registering said responses.

2. System according to claim 1, characterized in that for each stimulus the time interval between the moment of start of the stimulus and the moment the switching means are operated is measured and registered by a recording means.

3. System according to claim 1, characterized in that each time the time interval between the moment of presenting questions, messages, commands and instructions and the moment the corresponding response is provided is measured and registered by a recording means.

4. System according to claim 1, characterized in that in case the stimuli incorporate video stimuli the time marking and measurements are performed with resolution, accuracy and reproducibility better than a period of time corresponding to a single video frame.

5. System according to claim 1, characterized in that the system comprises a personal data means for registering personal data of individual respondents.

6. System according to claim 1, characterized in that the system comprises a factors means for measuring and registering conditions and environmental factors prevailing during the presentation of the stimuli.

7. System according to claim 1, characterized in that at least one source is able to select from a number of stimuli, wherein the selection of which stimulus to be presented next to a respondent is dependent on given responses by said respondent.

8. System according to claim 1, characterized in that said at least one source of audiovisual stimuli is able to select from a number of stimuli, wherein the selection of which stimulus to be presented next to a respondent is dependent on the personal data of said respondent.

9. System according to claim 1, characterized in that said at least one source of audiovisual stimuli is able to select from a number of stimuli, wherein the selection of which stimulus to be presented next to a respondent is dependent on the conditions and environmental factors prevailing during the presentation of the stimuli.

10. System according to claim 1, characterized in that said at least one source of audiovisual stimuli is able to select from a number of stimuli, wherein the selection of which stimulus to be presented next to a respondent is dependent on the moments in time on which the switching means and the response means are operated by said respondent.

11. System according to claim 1, characterized in that said at least one source is able to select from a number of stimuli, wherein the selection of which stimulus to be presented next to a respondent is based on statistical sampling conditions.

12. System according to claim 1, characterized in that the system comprises normalizing means for relating, accumulating and normalizing all the various responses, time values and time intervals related to stimuli.

13. System according to claim 1, characterized in that the system comprises normalizing means for relating, accumulating and normalizing all the various responses, time values and time intervals related to respondents, characterizing similarities and differences between groups.

14. System according to claim 13, characterized in that the system comprises means for numerically or graphically presenting relations between, on the one hand, the normalized results concerning time values, time intervals and responses and, on the other hand, individual stimuli, groups of stimuli, respondents, sample groups of respondents and sub groups thereof.

* * * * *